(12) United States Patent
Sone (10) Patent No.: US 6,233,201 B1
(45) Date of Patent: *May 15, 2001

(54) VOLTAGE MONITORING CIRCUIT AND MEMORY CARD INCORPORATING THE SAME

(75) Inventor: Toshihisa Sone, Osaka (JP)

(73) Assignee: Oki Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,604

(22) Filed: Oct. 15, 1998

(30) Foreign Application Priority Data

Jul. 7, 1998 (JP) .................................. 10-191688

(51) Int. Cl.[7] ....................................... G11C 8/00
(52) U.S. Cl. ................ 365/241; 365/189.07; 365/189.09
(58) Field of Search .............................. 365/55, 241, 213, 365/225.5, 189.07, 189.09, 52; 340/825.57; 323/255; 235/380

(56) References Cited

U.S. PATENT DOCUMENTS

| | | | |
|---|---|---|---|
| 4,608,486 | * 8/1986 | Berstein et al. | 235/380 |
| 5,434,397 | 7/1995 | Diehl et al. | 235/380 |
| 5,475,381 | * 12/1995 | Williamson et al. | 340/825.57 |
| 5,537,584 | 7/1996 | Miyai et al. | 395/183.18 |
| 5,596,263 | * 1/1997 | Zavis et al. | 323/255 |
| 5,638,320 | 6/1997 | Wong et al. | 365/185.03 |
| 5,664,089 | 9/1997 | Byers et al. | 395/182.12 |
| 5,798,961 | * 8/1998 | Heyden et al. | 365/52 |

FOREIGN PATENT DOCUMENTS

| | | | |
|---|---|---|---|
| 2 745 415 | 2/1996 | (FR) | G11C/5/14 |
| 2 749 698 | 6/1996 | (FR) | G11C/16/06 |

* cited by examiner

*Primary Examiner*—David Nelms
*Assistant Examiner*—Thong Le
(74) *Attorney, Agent, or Firm*—Venable; Robert J. Frank; Jeffrey W. Gluck (57) ABSTRACT

A voltage monitoring circuit compares a voltage, which is obtained by dividing the voltage required for writing or erasing data to or from a semiconductor storage device, with a reference voltage (Vref) using a comparator, and if the comparison result indicates that the voltage required for writing or erasing data is not being supplied, then it disables the operation of a CPU, thus enabling quick discovery of a failure of the supply of the voltage necessary for writing to or erasing from the semiconductor storage device.

19 Claims, 4 Drawing Sheets

VOLTAGE MONITORING CIRCUIT AND MEMORY CARD INCORPORATING THE SAME

BACKGROUND OF THE INVENTION

1. Field of the Invention

The present invention relates to a voltage monitoring circuit for monitoring the voltage used for writing data to or erasing it from a semiconductor storage and, more particularly, to a voltage monitoring circuit intended for a semiconductor storage incorporated in a memory card or the like.

2. Description of the Related Art

Cards in which information can be recorded have been used in a variety of fields. The cards are available as magnetic cards for retaining necessary information in the form of magnetic information or as memory cards designed to store necessary information in semiconductor storages. The memory cards come in two types: one type has a built-in semiconductor storage, and the other type incorporates a program memory or the like for implementing required processing by accessing a central processing unit or other desired processing; the latter type is known as an IC card. Semiconductor devices built in the memory cards include dynamic random access memories or static random access memories that permit read and write (hereinafter referred to as "RAM"), electrically erasable and programmable read only memories (hereinafter referred to as "EEPROM"), and flash memories that permit erasure in block sizes.

Generally, when a user of a memory card tries to use the memory card, the personal identification number of the user is checked to make sure that the person attempting to use it is the authorized user of the memory card. The IC card is available in two types: in one type of IC card, the personal identification number is checked on the card reader/writer side or the host side; in the other type, the check is performed within the IC card. The following describes an example of the checking procedure applied to the type of IC card adapted to check the personal identification number within the IC card.

First, a personal identification number is entered through an input circuit provided on the surface of a card medium of the IC card. The entered personal identification number is checked against the personal identification number that has been stored in the IC card beforehand. When the check result indicates agreement, the use of the IC card is authorized to proceed to the subsequent processing such as referring to a transaction history or other information that has already been stored in the IC card. If the check result indicates disagreement, then the personal identification number is entered again to repeat the check. If the check result indicates disagreement for a predetermined number of times, e.g., three in succession, then the subsequent processing of the IC card is disabled and the use of the IC card itself is prohibited at the same time. The number of disagreements revealed by the check is stored and updated in a built-in semiconductor storage as the number of error counts each time the check result shows the disagreement. Hence, when a error count number reaches the predetermined number, e.g. three, the use of the IC card itself will be prohibited.

To check the personal identification number for the IC card by using the card reader/writer, the IC card is inserted in the card reader/writer and the personal identification number is entered through the input circuit provided on the card reader/writer. The rest of the procedure is identical to that mentioned above.

Such a function prevents unauthorized use of an IC card obtained by a third person who has obtained the IC card by theft or the like unless the third person knows the authorized personal identification number of the IC card. The personal identification number is composed, for example, of a combination of a plurality of characters or numerals so that it cannot be guessed correctly within a predetermined number of attempts. Thus, the security of IC cards is maintained.

As described above, the error count number is written to the semiconductor storage built in the IC card. For instance, to write data to or erase it from the IC card, a voltage, e.g., a high voltage of about 20 volts for an EEPROM, is required. If the supply of such a voltage to the semiconductor storage is prohibited due to damage to a source generating the voltage required for writing or erasing or due to disconnected wiring for supplying the voltage required for writing or erasing to the semiconductor storage, then writing or erasing the error count number is disabled. This applies not only to the IC cards but also to the memory cards that have built-in semiconductor storages requiring such a special voltage.

If an unauthorized third party tries entering personal identification numbers to use a card which has been reworked so that the supply of the voltage required for writing or erasing to a semiconductor storage is disabled, then the error count number is no longer written to or updated in the semiconductor storage. This enables the check of a personal identification number to be performed for a number of times exceeding a predetermined number. This presents a problem in that a third party may eventually determine a correct personal identification number, and as a result, unauthorized use of an IC card or a memory card will be permitted.

SUMMARY OF THE INVENTION

Accordingly, it is an object of the present invention to provide a voltage monitoring circuit that permits quick discovery of the aforesaid failure of the supply of a voltage required for writing data to or erasing it from a semiconductor storage.

It is another object of the present invention to achieve accurate operation in the voltage monitoring circuit.

It is still another object of the present invention to apply the voltage monitoring circuit to a memory card so as to maintain security even if a memory card has been reworked to disable the supply of a voltage required for writing data to or erasing it from a semiconductor storage.

To these ends, according to one aspect of the present invention, there is provided a voltage monitoring circuit for monitoring a desired voltage, the voltage monitoring circuit having a detector circuit that detects whether the voltage used for writing data to or erasing it from a semiconductor storage is a permissible voltage and issues a control signal for controlling the operation of peripheral circuitry as the detection result.

The detector circuit in accordance with the present invention may have a comparing circuit that compares an output signal expected to have the desired voltage, with a reference voltage and issues a signal indicative of the comparison result. It may additionally have a retaining circuit that retains an output signal from the comparing circuit and issues a signal based on the output signal as a control signal.

The semiconductor storage in accordance with the present invention is a nonvolatile memory using a high voltage, which is higher than the line voltage, for writing or erasing; and the detector circuit may have a voltage dividing circuit which divides the supplied high voltage so as to compare the voltage divided through the voltage dividing circuit with the reference voltage using the comparing circuit.

The detector circuit in accordance with the present invention may have a level changing circuit that changes the level of an activating signal, which corresponds to a line voltage, to a high voltage level, according to a high voltage generated externally, and supplies the high voltage after the level change is supplied to a voltage dividing circuit.

Further, in the memory card incorporating the voltage monitoring circuit in accordance with the present invention, the data written to or erased from a part of the semiconductor storage is the number of times a personal identification number is checked. The checking of the personal identification number is carried out according to a first program stored in a semiconductor storage for storing programs that is independently provided from the semiconductor storage, and the activating signal is generated according to a second program stored in the semiconductor storage for storing programs.

In the semiconductor storage for storing programs in the memory card according to the present invention, the first program, the second program, and a third program for carrying out the processing of access to an area of the semiconductor storage where the number of checks of a personal identification number is written or erased are stored in a scattered manner. The second program is executed according to an instruction given by the first program, and the third program is executed by an instruction given by the second program.

DESCRIPTION OF THE PREFERRED EMBODIMENTS

Figure 1:
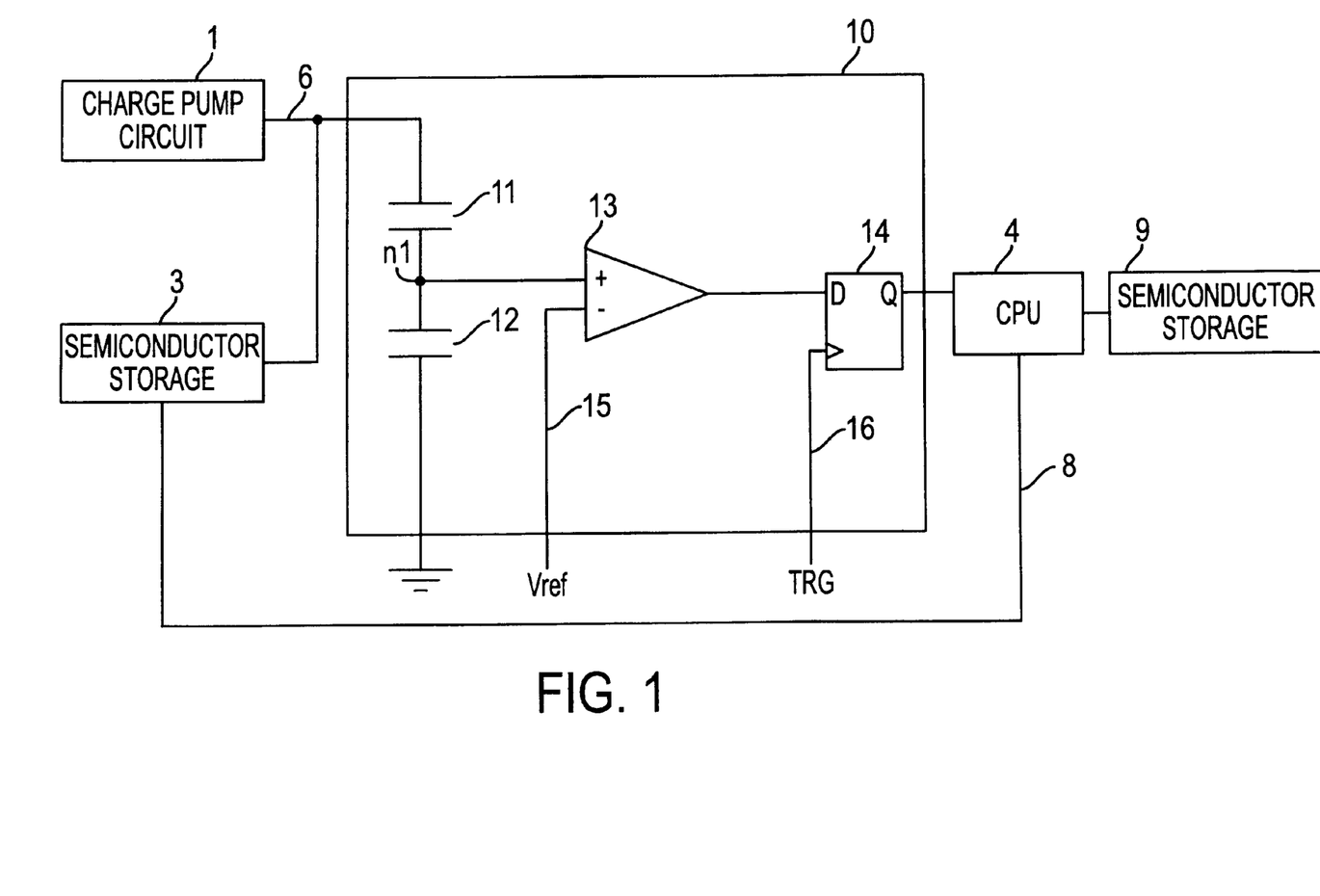
FIG. 1 is a circuit diagram of a voltage monitoring circuit (10) in a first embodiment in accordance with the present invention.

The voltage monitoring circuit in accordance with the present invention will be explained in detail in conjunction with the accompanying drawings. FIG. 1 is a circuit diagram of a voltage monitoring circuit 10 in a first embodiment. An IC card will be used as the embodiment; hence, it is assumed that the voltage monitoring circuit 10 shown in FIG. 1 and the peripheral circuitry thereof are included in the IC card.

As illustrated in FIG. 1, provided inside the IC card are: a charge pump circuit 1 serving as a high-voltage generating circuit that generates a high voltage Vpp (e.g., 20 volts) which is higher than a line voltage Vdd (e.g., 5 volts); a semiconductor storage 3 that stores, in a part thereof, the number of successive disagreements, i.e. the error count number, in the checking of a personal identification number; a central processing unit (hereinafter referred to as "CPU") 4 that reads out a desired program from a semiconductor storage 9 for storing programs for accessing the semiconductor storage 3 and other programs for implementing various types of processing in the card, including the checking of personal identification numbers and updating transaction history information and control of other circuits in the IC card; and a voltage monitoring circuit 10.

The charge pump circuit 1 boosts the line voltage Vdd to the high voltage Vpp and transmits the high voltage Vpp to a line 6. The high voltage Vpp is supplied via the line 6 to the semiconductor storage 3 and the voltage monitoring circuit 10.

The semiconductor storage 3 uses the high voltage Vpp supplied through the line 6 to write data or erase written data. More specifically, in this embodiment, an EEPROM using high voltage for writing or erasing data is taken as an example of the semiconductor storage 3. If the semiconductor storage 3 uses DRAM or the like, which writes or erases on the line voltage Vdd, then the charge pump circuit 1 is not required; in this case, line voltage Vdd is supplied via the line 6.

The operation of the CPU 4 is controlled by the control signals issued by the voltage monitoring circuit 10. For instance, when the voltage level of the control signal is at line voltage Vdd level (hereinafter referred to as "H level") the operation of the CPU 4 is disabled, whereas when the voltage level of the control signal is at ground voltage Vss level (hereinafter referred to as "L level"), the operation of the CPU 4 is enabled (i.e., in a state in which normal operation is enabled). The CPU 4 supplies a signal for controlling the operation of the semiconductor storage 3, e.g., a write signal or a read signal, to the semiconductor storage 3 via line 8.

The voltage monitoring circuit 10 has a dividing circuit composed of two capacitors 11 and 12, a comparator 13, which is a comparing circuit, and a D flip-flop 14, which is a retaining circuit.

One end of the capacitor 11 is connected to the line 6, and the other end thereof is connected to a node nl. One end of the capacitor 12 is connected to the node nl; the ground voltage Vss (0 volt) is supplied to the other end thereof. In this embodiment, the ratio of the capacitance of the capacitor 11 to that of the capacitor 12 is 1 to N (N is a positive integer). Hence, the voltage at the node nl is equal to the voltage at one end of the capacitor 11, namely, 1/(N+1) of the voltage supplied through the line 6. For example, if the voltage supplied through the line 6 is 20 volts and N=9, then the voltage at the node nl will be 20/(9+1)=2 volts.

As will be discussed later, the comparator 13 performs comparison of the voltage at the node nl with a reference voltage Vref. The high voltage Vpp may be directly supplied to the comparator 13 and compared with the reference voltage Vref; however, the high voltage is prone to be considerably affected by noise. For this reason, it is preferable to divide the high voltage to achieve more accurate comparison. Additionally, using the high voltage Vpp as it is for the comparison by the comparator 13 would require a high voltage to be used for the reference voltage Vref. The reference voltage Vref is normally dependent upon the line voltage Vdd, so an extra system for boosting the reference voltage Vref would be necessary. Hence, it is more desirable to compare a voltage divided from the high voltage with the reference voltage Vref.

Two capacitors are used for dividing the voltage; or two resistive elements may be used instead.

The voltage at the node nl is supplied to the positive input end, which is one input terminal, of the comparator 13; and the reference voltage Vref is supplied through a line 15 to the negative input end, which is the other input terminal thereof. From the viewpoint of the accuracy of comparison, the reference voltage Vref should be dependent upon the line voltage Vdd. The comparator 13 compares the two supplied voltages and outputs the comparison result. For instance, if the reference voltage Vref is 2 volts and if the voltage to be obtained by the voltage division, i.e. the voltage at the node nl, according to the reference voltage Vref, should be 2 volts, then the comparator 13 issues the H-level output signal as a comparison result if the voltage at the node nl has not reached 2 volts. If the voltage at the node nl has reached 2 volts, then the comparator 13 issues the L-level output signal as the comparison result.

A data input terminal D of the D flip-flop 14 receives an output signal of the comparator 13 and a clock terminal thereof receives a trigger signal TRG via a line 16. When the D flip-flop 14 receives a clock pulse as the trigger signal TRG, it stores the signal applied to the data input terminal D in response to the rise of the clock pulse and issues a signal corresponding to a voltage level, which is based on the stored signal, from an output terminal Q. For example, if the voltage level of the signal applied to the data input terminal D is H level, then a signal of H voltage level is issued from the output terminal Q; or if the voltage level of the signal applied to the data input terminal D is L level, then a signal of L voltage level is issued from the output terminal Q. The signals emitted from the output terminal Q provide the control signals which are the outputs of the voltage monitoring circuit 10. In this embodiment, the D flip-flop 14 is employed as the retaining circuit; however, it may be replaced by a register or the like as long as it has similar performance.

In the embodiment, the control signals which are the outputs of the voltage monitoring circuit 10 are supplied to the CPU 4 which is one of the peripheral circuits; however, they may be used for other peripheral circuits like the charge pump circuit 1, to control the boosting operation thereof. In this case, the control signals disable the operation of the CPU 4 and the boosting operation as well; hence, the current consumed for boosting is reduced. Furthermore, even if the CPU 4 should carry out unexpected processing during the disabling and the CPU 4 should fail to stop the operation of the charge pump circuit 1, the operation of the charge pump circuit 1 can be securely controlled without depending on the CPU 4.

Figure 2:
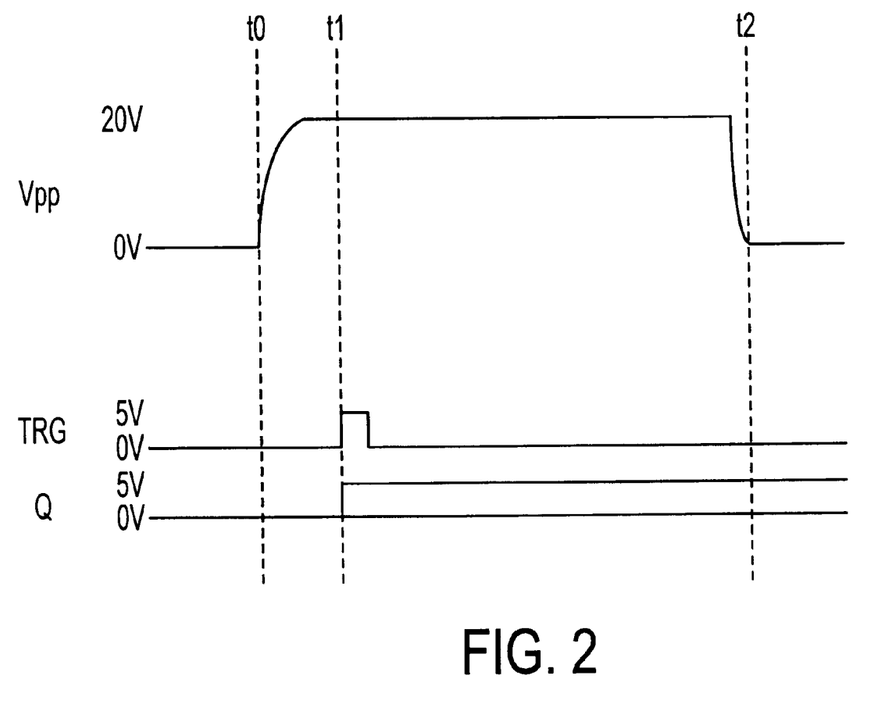
FIG. 2 is a timing chart illustrating the operation of the voltage monitoring circuit (10) in the first embodiment in accordance with the present invention.

The operation timing of the voltage monitoring circuit 10 will now be explained in conjunction with the accompanying drawings.

FIG. 2 shows a timing chart illustrative of the operation timing of the voltage monitoring circuit 10. It is assumed that a signal of the L voltage level is being emitted from the output terminal Q of the D flip-flop 14 in the initialized state.

First, in response to an instruction for writing or erasing data to or from the semiconductor storage 1 given by the CPU 4, the operation of the charge pump circuit 1 is initiated at time t0 and the voltage Vpp to be transmitted to the line 6 is boosted. At the timing, namely, time t1, by which the voltage Vpp will have been fully boosted to a desired voltage e.g., 20 volts, the trigger signal TRG is applied; by this time, the comparator 13 will also have completed its comparison processing. At the rise of the trigger signal TRG, the D flip-flop 14 issues a signal of the voltage level corresponding to the output signal of the comparator 13 from the output terminal Q as the control signal. In the waveform at the output terminal Q in FIG. 2, if a solid line follows after time t1, it means that the voltage level of the output signal of the comparator 13 has been at the L level, that is, the voltage Vpp has reached the desired voltage; if a dashed line follows, it means that the voltage level of the output signal of the comparator 13 has been at the H level, that is, the voltage Vpp has not reached the desired voltage level. The voltage at the output terminal Q is maintained even if the boosting of the voltage Vpp in the charge pump circuit 1 is stopped at time t2. Therefore, even if the voltage level of the output signal of the comparator 13 changes, the voltage level of the control signal which is the output of the voltage monitoring circuit 10 remains unchanged, so that the CPU 4 is not affected.

Figure 3:
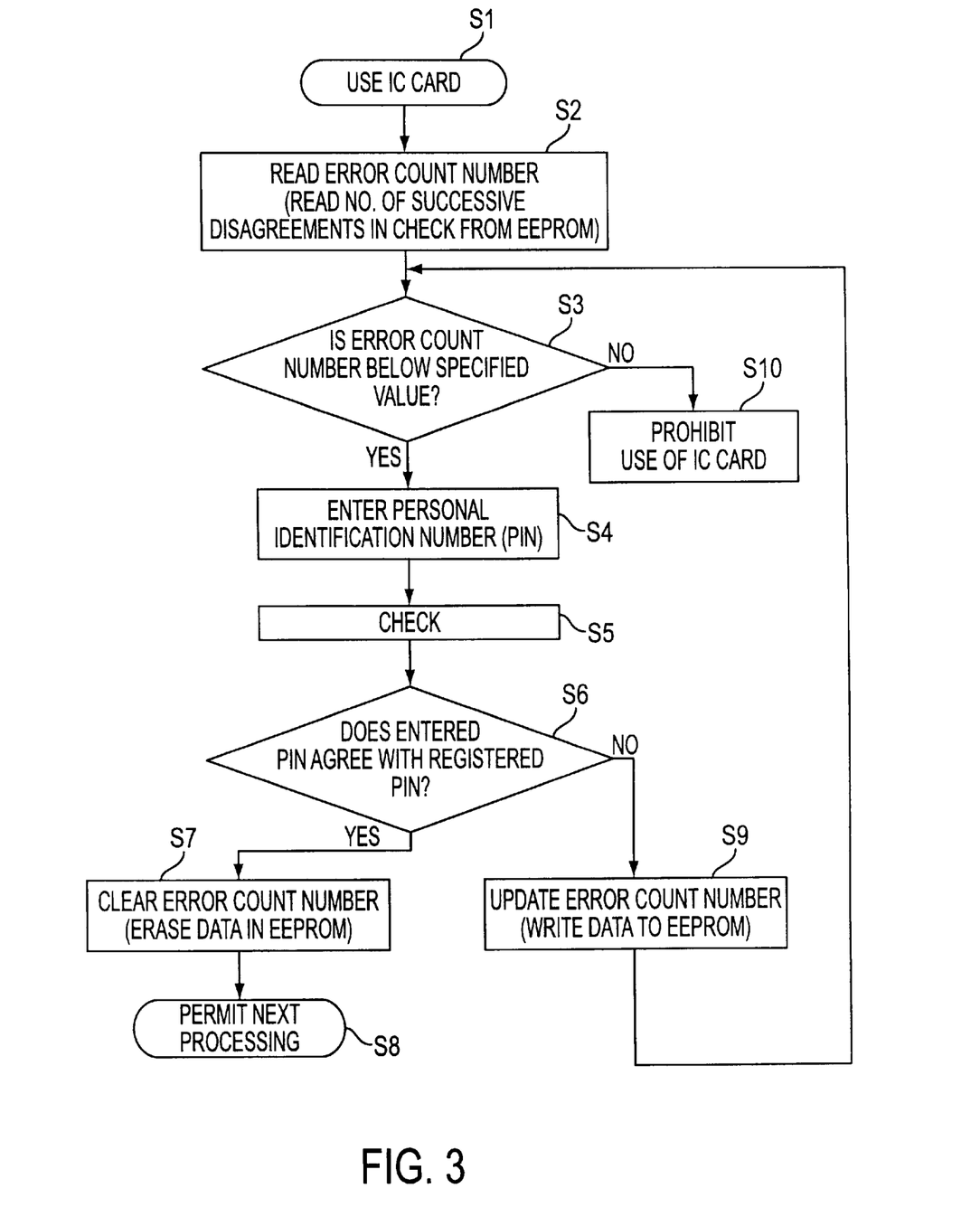
FIG. 3 is a flowchart showing the checking procedure of a personal identification number in an IC card.

A case where the voltage monitoring circuit 10 according to the embodiment and the peripheral circuitry thereof are applied to an IC card will now be described. FIG. 3 shows a flowchart illustrating the checking procedure of a personal identification number in the IC card.

First, it is confirmed in step S1 that the intention of using the IC card has been indicated. This is done, for instance, by turning the power ON in the IC card; or in a card reader/writer, it is done by inserting the IC card in the card reader/writer.

Then, the error count number, namely, the number of successive disagreements of a personal identification number in the checking of the personal identification number, is read in step S2. Specifically, a signal for instructing the semiconductor storage 3 to read is transferred via the line 8 from the CPU 4 in FIG. 1. In the initialized state, the error count number is 0.

The CPU 4 compares the read error count number with a permissible or specified number of successive disagreements in step S3. If the specified number 3, then the condition in which the error count number≧the specified value is not satisfied since the error count number in the initialized state is 0; therefore, the program proceeds to step S4 for the input processing of the personal identification number.

To implement the checking procedure in the IC card, the CPU 4 built in the IC card executes the personal identification number checking program to accept the personal identification number through the input circuit provided on the surface of the card medium. To implement the checking on the card reader/writer side, the personal identification number is entered through the input circuit of the card reader/writer. When no particular explanation is given in the following processing, it means that the same applies to the checking procedure implemented in the IC card and that in the card reader/writer.

In step S5, the entered personal identification number is checked against the one that has been registered in advance. The personal identification number to be registered beforehand may be stored in the storage circuit in the IC card when carrying out the checking procedure in the IC card; or it may be stored in the storage circuit in the IC card or a host computer capable of transferring data to and from the card reader/writer when carrying out the checking procedure in the card reader/writer.

When the personal identification number checking procedure is implemented in the IC card, the CPU 4 is responsible for it; or when it is implemented in the card reader/writer, the CPU 4 or the host computer is responsible for it.

The constituent responsible for checking the personal identification number, namely, the CPU 4 or the host computer, makes a decision based on the check of the personal identification number in step 56. If the entered personal identification number agrees with the registered personal identification number, then the error count number stored in a part of the semiconductor storage 3 is reset, that is, set to 0 in step S7. This is done because, if disagreement occurred in the first or second check, then the error count number would have been updated to 1 or 2. In step S7, the CPU 4 erases the data, namely, the error count number, in a part of the semiconductor-storage 3. At this time, a signal instructing the generation of the high voltage Vpp is sent, for example, from the CPU 4 to the charge pump circuit 1. As described above, the voltage monitoring circuit 10 monitors the high voltage Vpp.

After erasing the error count number, the IC card is allowed to proceed to the next processing, e.g., the checking of a transaction history, and its use is authorized in step S8.

If the entered personal identification number does not agree with the registered personal identification number, then the error count number is updated in the semiconductor storage 3 in step S9. In step S9, the CPU 4 updates the data, namely, the error count number, in the semiconductor storage 3; hence, the error count number is updated, for example, from 0 to 1. At this time, a signal instructing the generation of the high voltage Vpp is sent, for instance, from the CPU 4 to the charge pump circuit 1. As mentioned above, the voltage monitoring circuit 10 monitors the high voltage Vpp.

After step S9, the program goes back to the processing of step S3, wherein the updated error count number is compared with a specified value. If the comparison result indicates that the condition "the error count number≧the specified value" is not satisfied, then the processing of step S4 and after is carried out. At this time, the error count number is further updated to 2. After that, the processing of steps S3 through S6 and S9 is repeated until the entered personal identification number agrees with the registered one or the condition "the error count number≧the specified value" is satisfied. If the disagreement of the personal identification numbers occurs in succession until it satisfies the condition "the error count number≧the specified value" in step S3, then it is very likely that the person who has entered the personal identification number is attempting unauthorized use of the IC card, so that the program prohibits the use of the IC card in step S10 by supplying a prohibition signal for disabling the operation to the CPU 4, the prohibition signal being separately supplied from the control signals issued from the voltage monitoring circuit 10.

If a third person enters personal identification numbers after an IC card has been reworked so that the supply of the voltage required for writing or erasing to the semiconductor storage is disabled in an attempt to make unauthorized use of the IC card, then the error count number is not written to or updated or erased in the semiconductor storage. The voltage monitoring circuit 10, however, detects that the voltage required for writing or erasing is not being generated and it sends a control signal to the CPU 4. The control signal disables the operation of the CPU 4.

Thus, as explained in detail above, the use of the voltage monitoring circuit 10 in the first embodiment makes it possible to prevent the unauthorized use of a card, which is provided with the voltage monitoring circuit 10, by a third party. This improves the security of the card.

The application of a circuit similar to the voltage monitoring circuit 10 is not limited to a card; providing a device having a semiconductor storage with such a circuit makes it possible to quickly discover problems including malfunction of and disconnection from a circuit or wiring for supplying the voltage used for writing or erasing data to or from the semiconductor storage, since the operation of peripheral circuitry is disabled.

Figures 4, 5:
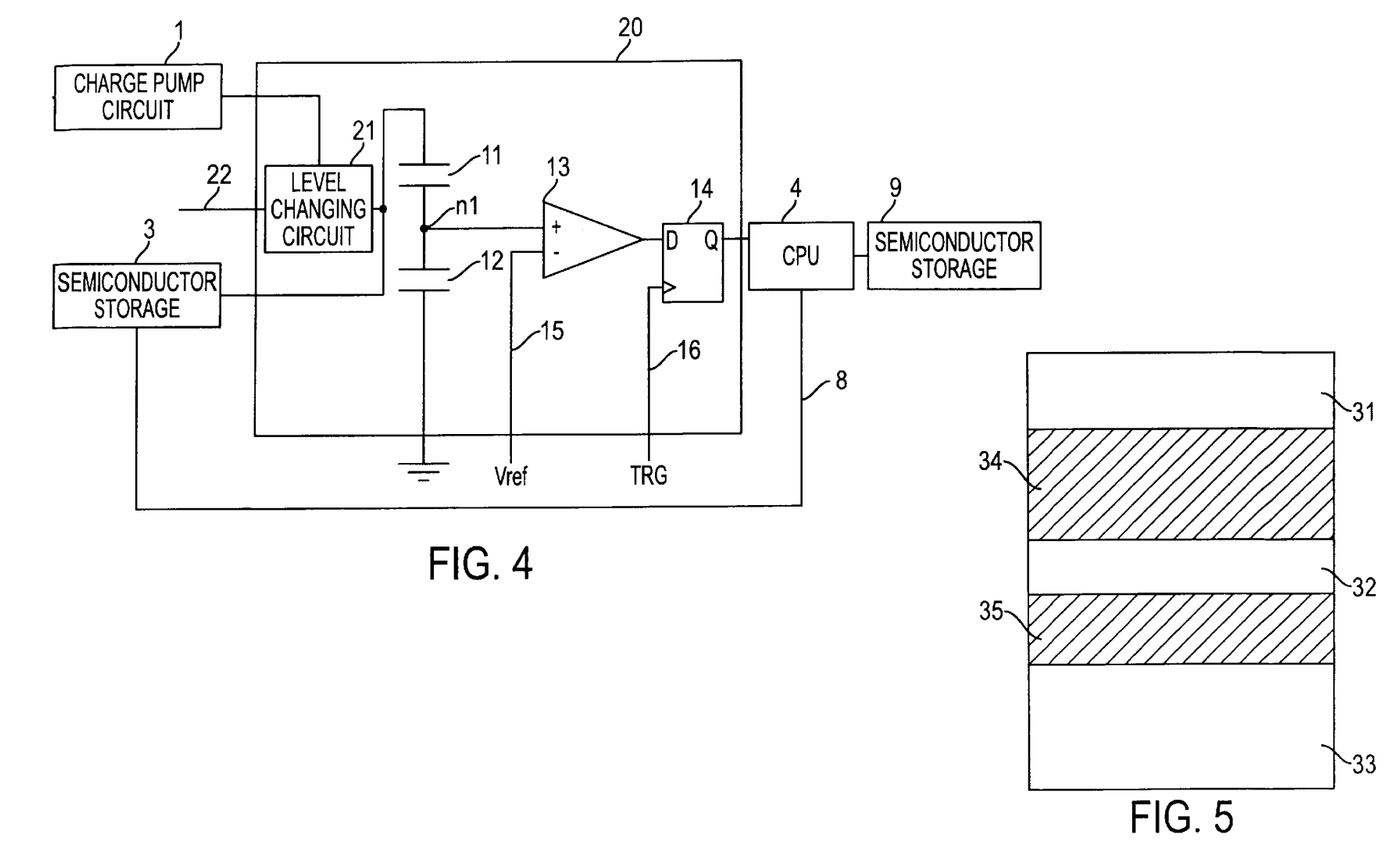
FIG. 4 is a circuit diagram of a voltage monitoring circuit (20) in a second embodiment of the present invention.
FIG. 5 is a diagram showing a program stored in a semiconductor storage (9) for storing programs in the second embodiment of the present invention.

A second embodiment will now be described with reference to the accompanying drawings. FIG. 4 is a circuit diagram showing a voltage monitoring circuit 20 in the second embodiment. In FIG. 4, like constituents as those in FIG. 1 are assigned the like reference numerals.

The second embodiment shown in FIG. 4 is equipped with a level changing circuit 21 that receives an activating signal via a line 22. In FIG. 4, one end of the capacitor 11 and the semiconductor storage 3, which received the high voltage Vpp output from the charge pump circuit 1 via the line 6 in FIG. 1, now receive the output of the level changing circuit 21 in FIG. 4. The rest of the configuration shown in FIG. 4 is identical to the configuration shown in FIG. 1 except for the program storing constitution of semiconductor storage 9, which will be discussed later.

The level changing circuit 21 changes the line voltage Vdd level of the activating signal supplied through the line 22 to the high voltage Vpp level. This level change utilizes the high voltage Vpp generated by the charge pump circuit 1. The signal that has undergone the level change is output from the level changing circuit 21. The activating signal is produced, for example, by the CPU 4. The activating signal is generated by a program for generating the activating signal; normally, the activating signal of an ground voltage level, namely, zero volt level, is changed to a signal of the line voltage Vdd level. The program for accessing the semiconductor storage 3 for updating or erasing the error count number is stored the semiconductor storage 9 for storing a program as are other programs for implementing diverse types of processing in an IC card, including the checking of personal identification numbers and processing transaction history information. The semiconductor storage 9 for storing programs employs, for example, a mask ROM, which is a programmable memory.

How the programs are stored in the semiconductor storage 9 for storing programs is shown in FIG. 5. In FIG. 5, the address numbers decrease upward, while they increase downward.

The programs for implementing the processing on the semiconductor storage 3 are stored in a memory area 31 on the lower address side. The programs include the program for writing or erasing the error count number.

Stored in a memory area 32 is the program for generating the activating signal. The program for generating the activating signal includes an instruction for jumping to the program for writing or erasing the error count number, stored in the foregoing memory area 31, after the activating signal is generated.

Stored in a memory area 33 are application programs including the one for checking personal identification numbers. The program for checking personal identification numbers includes an instruction for jumping to the program for generating the activating signal, stored in the aforesaid memory area 32, after implementing step S6 of the flowchart shown in FIG. 3.

Memory areas 34 and 35 are used to store programs for implementing other types of processing. If the program for checking personal identification numbers is defined as a first program, the program for generating the activating signal is defined as a second program, and the program for writing or erasing the error count number is defined as a third program, then the second program is executed in response to an instruction given by the first program, and the third program is executed in response to an instruction given by the second program. These three programs are stored in such a manner that they are scattered, with the memory areas 34 and 35 lying therebetween.

The operation of the voltage monitoring circuit 20 thus configured will now be described. Referring to the flowchart shown in FIG. 3, the same processing as that in the first embodiment is carried out in steps S1 through S6. Steps S5 and S6 are implemented by the first program, namely, the program for checking personal identification numbers.

In FIG. 3, when the program moves from step S6 to step S7 or S9, the second program is executed in response to an instruction given by the first program in the second embodiment. When the second program is executed, the activating signal is generated. In other words, executing the second program enables the level change by the level changing circuit 21, and the high voltage Vpp used for writing or erasing can be supplied to the semiconductor storage 3 according to the operation state of the charge pump circuit 1. After that, in response to an instruction given by the second program, the third program for writing data to or erasing it from the semiconductor storage 3 is implemented. The instructions for operating the charge pump circuit 1 may be given by the second or third program.

When both the charge pump circuit 1 and the level changing circuit 21 are actuated, the high voltage Vpp is also supplied to one end of the capacitor 11 of the voltage monitoring circuit 20. Hence, the same voltage monitoring as that of the first embodiment can be accomplished. The operation thereafter is identical to that of the first embodiment.

Thus, as explained in detail above, the voltage monitoring circuit 20 in the second embodiment is able to provide the same advantage as that obtained in the first embodiment. Furthermore, in the second embodiment, the voltage used for writing data to or erasing it from the semiconductor storage 3 is not supplied unless the activating signal is generated (the voltage level of the activating signal is changed to the line voltage Vdd level); hence, if the activating signal cannot be produced due to a failure of the constituent generating the activating signal (the constituent in the embodiments is in the CPU 4, however, it is not limited thereto), then the high voltage Vpp is not supplied to the voltage monitoring circuit 20, making it possible for the voltage monitoring circuit 20 to disable the operation of the CPU 4. This permits quick discovery of a failure.

In addition, the second program for generating the activating signal is provided independently of the first program for checking personal identification numbers and the third program for writing or erasing the error count number; therefore, the activating signal is not produced and the voltage employed for writing data to or erasing it from the semiconductor storage 3 is not generated accordingly even if the CPU 4 should go out of control and suddenly jump from the first program to the third program. This enables the voltage monitoring circuit 20 to disable the malfunctioning CPU 4 and to protect data stored in the semiconductor storage 3 from being tampered with.

Especially when the first program, the second program, and the third program are stored in the semiconductor storage 9 for storing programs so that they are as much scattered as possible, secure measures can be taken against the aforesaid unexpected malfunction of the CPU 4.

The charge pump circuit 1 and the level changing circuit 21 are not required if the semiconductor storage 3 is able to write or erase by using the line voltage Vdd; as an alternative, however, the activating signal may be supplied to the semiconductor storage 3 or to one end of the capacitor 11. In this case, the semiconductor storage 3 would write or erase information by using the activating signal.

Further, in place of the level changing circuit 21, a transfer gate may be provided to control the supply of the voltage generated by the charge pump circuit 1 to the semiconductor storage 3 and to one end of the capacitor 11. In this case, the foregoing advantage can be obtained by employing the activating signal for controlling the operation of the transfer gate. When the semiconductor storage 3 uses the high voltage Vpp for writing or erasing, the voltage of the activating signal must be boosted to the high voltage Vpp. If the supply of the line voltage Vdd is controlled by the transfer gate instead of the charge pump circuit 1, then the semiconductor storage 3 may use a semiconductor storage capable of writing or erasing by utilizing the line voltage Vdd; in this case, the voltage of the activating signal may be the line voltage Vdd.

Thus, it is understood from the above explanation that the voltage monitoring circuit in accordance with the present invention is not limited to the constitutions of the above embodiments.

Furthermore, the devices to which the voltage monitoring circuit in accordance with the present invention are not limited to IC cards but may be extensively used for memory cards. The application of the present invention is not limited to cards; the same advantage can be obtained by applying the invention to other devices having a similar problem. The embodiments have presented the examples where the invention has been applied to cards merely to explain the features and advantages obtained thereby.

What is claimed is:

1. A voltage monitoring circuit for monitoring a first voltage, comprising:
    a detector circuit that compares said first voltage with a reference voltage and outputs a control signal for controlling operation of a control circuit controlling the writing of data to and the erasing of data from a memory, said first voltage being generated from a voltage used to write data to or to erase data from the memory, said first voltage being lower than said second voltage.

2. The voltage monitoring circuit according to claim 1, wherein said detector circuit comprises:
    a comparing circuit that performs the comparison of said first voltage with said reference voltage; and
    a retaining circuit that retains an output signal of said comparing circuit and outputs a signal based on said output signal as said control signal.

3. The voltage monitoring circuit according to claim 2, wherein: said memory is a nonvolatile memory using a high voltage, which is higher than a supply voltage, for writing or erasing; and wherein said detector circuit further comprises a voltage dividing circuit which divides said high voltage to generate said first voltage for comparison in said comparing circuit.

4. The voltage monitoring circuit according to claim 3, wherein said detector circuit further comprises a level changing circuit that changes the level of an activating signal, which corresponds to said supply voltage, to a high voltage level according to a high voltage generated externally, said level changing circuit supplying said high voltage to said voltage dividing circuit.

5. The voltage monitoring circuit according to claim 1, wherein the data written to or erased from a part of said memory is the number of times a personal identification number is checked.

6. The voltage monitoring circuit according to claim 2, wherein the data written to or erased from a part of said memory is the number of times a personal identification number is checked.

7. The voltage monitoring circuit according to claim 3, wherein the data written to or erased from a part of said memory is the number of times a personal identification number is checked.

8. The voltage monitoring circuit according to claim 4, wherein the data written to or erased from a part of said memory is the number of times a personal identification number is checked.

9. The voltage monitoring circuit according to claim 1, wherein said voltage monitoring circuit is applied to a memory card.

10. The voltage monitoring circuit according to claim 2, wherein said voltage monitoring circuit is applied to a memory card.

11. The voltage monitoring circuit according to claim 3, wherein said voltage monitoring circuit is applied to a memory card.

12. The voltage monitoring circuit according to claim 4, wherein said voltage monitoring circuit is applied to a memory card.

13. A card comprising:

a nonvolatile memory using a high voltage, which is higher than a supply voltage, for writing or erasing; and a voltage monitoring circuit, said voltage monitoring circuit comprising:

a detector circuit that detects whether a high voltage used for writing data to or erasing it from said nonvolatile memory is at a permissible voltage level, said detector circuit outputting a control signal as a detection result for controlling operation of peripheral circuitry, said detector circuit comprising a level changing circuit that changes the level of an activating signal, whose voltage level corresponds to said supply voltage, and which is output from peripheral circuitry controlled by said control signal, to a high voltage level according to a voltage generated externally, said level changing circuit outputting a high voltage signal resulting from the level changing to said nonvolatile memory.

14. The card according to claim 13, further comprising a semiconductor storage for storing programs provided independently from said nonvolatile memory, and wherein: (1) data written to or erased from a part of said nonvolatile memory corresponds to a number of times a personal identification number is checked; (2) the checking of said personal identification number is carried out by a first program stored in said semiconductor storage; (3) said activating signal is generated by a second program stored in said semiconductor storage; (4) said first program, said second program and a third program for carrying out processing of access to said part of said nonvolatile memory are stored in a scattered manner in said semiconductor storage; and (5) said second program is executed according to an instruction given by said first program, and said third program is executed according to an instruction given by said second program.

15. The card according to claim 13, said detector circuit further comprising:

a dividing circuit for dividing said high voltage output signal from said level changing circuit;

a comparing circuit for comparing a divided voltage from said dividing circuit with a reference voltage, said comparing circuit generating an output signal representing a result of the comparison; and a retaining circuit for retaining said output signal from said comparing circuit, said retaining circuit outputting as a control signal a signal based on said output signal from said comparing circuit.

16. The voltage monitoring circuit according to claim 1, wherein the control signal outputted by said detector circuit has a first potential level for disabling operation of the control circuit when said first voltage is lower than said reference voltage and has a second potential level for enabling operation of the control circuit when said first voltage is higher than said reference voltage.

17. The card according to claim 13, wherein said peripheral circuitry comprises a control circuit that controls the writing of data to and the erasing of data from said nonvolatile memory.

18. The card according to claim 17, wherein the control signal outputted by said detector circuit has a first potential level for disabling operation of the control circuit when said first voltage is lower than said reference voltage and has a second potential level for enabling operation of the control circuit when said first voltage is higher than said reference voltage.

19. A voltage monitoring circuit for monitoring a desired high voltage, which is higher than a supply voltage, said high voltage being used to write data to or to erase data from a nonvolatile memory, comprising:

a detector circuit that compares a first voltage with a reference voltage and outputs a control signal as a detection result for controlling operation of a control circuit controlling the writing of data to and the erasing of data from said nonvolatile memory, said first voltage being generated from said desired high voltage, and said first voltage being lower than said desired high voltage.

* * * * *